(12) United States Patent
Oppelt et al.

(10) Patent No.: US 6,203,251 B1
(45) Date of Patent: Mar. 20, 2001

(54) INDEXABLE MILLING INSERT

(75) Inventors: Klaus Oppelt, Lauenburg; Bernd Bentjens, Schwarzenbek, both of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/401,687

(22) Filed: Sep. 23, 1999

(30) Foreign Application Priority Data

Oct. 17, 1998 (DE) .............................................. 198 48 045

(51) Int. Cl.[7] ........................................................ B23C 5/22
(52) U.S. Cl. ................................ 407/48; 407/49; 407/51; 407/113
(58) Field of Search .................................. 407/33, 40, 43, 407/47, 48, 49, 51, 66, 113, 114, 115, 116, 42

(56) References Cited

U.S. PATENT DOCUMENTS

| | | | | |
|---|---|---|---|---|
| 280,148 | * | 6/1883 | Douglas | 407/64 |
| 947,319 | * | 1/1910 | Wells | 407/42 |
| 4,189,264 | * | 2/1980 | Kraemer | 407/114 |
| 4,315,706 | * | 2/1982 | Erkfritz | 407/113 |
| 5,593,254 | * | 1/1997 | Peters | 407/48 |
| 5,653,274 | * | 8/1997 | Johnson et al. | 407/42 |
| 5,682,803 | * | 11/1997 | Boianjiu | 407/8 |
| 5,685,670 | * | 11/1997 | Satran | 407/42 |
| 5,944,456 | * | 8/1999 | Shirley et al. | 407/42 |
| 5,957,628 | * | 9/1999 | Bentjens et al. | 407/47 |

FOREIGN PATENT DOCUMENTS

| | | | | |
|---|---|---|---|---|
| 2555979 | * | 6/1977 | (DE) | 407/40 |
| 3446455 | * | 6/1986 | (DE) | 407/113 |
| 4304 071 | | 6/1994 | (DE) . | |
| 469672 | * | 2/1992 | (EP) | 409/137 |
| 1303277 | * | 4/1987 | (SU) | 407/66 |
| 1458091 | * | 2/1989 | (SU) | 407/66 |

\* cited by examiner

*Primary Examiner*—A. L. Wellington
*Assistant Examiner*—Erica D. Ergenbright
(74) *Attorney, Agent, or Firm*—Vidas, Arrett & Steinkraus, P.A.

(57) ABSTRACT

An indexable insert milling tool with a milling body which on the circumference comprises distanced chip spaces, in which insert seats for indexable cutting inserts are formed, and with fastening screws which can be screwed into a threaded bore in the insert seat for fastening the indexable inserts via a middle hole, wherein the insert seat comprises a first bearing surface extending roughly perpendicular to the threaded bore, against which the rear side of the indexable inserts bear and a second bearing surface on the inner side of the chip spaces, against which the indexable inserts laterally bear. The indexable insert on the rear side on the cutting edge sides comprise raised elongate support sections wedge-shaped in cross section with lower parallel distanced elongate support surfaces. Bordering the second bearing surface in the insert seat there are formed recesses whose axes run approximately parallel to the second bearing surface and which in cross section are formed complementarily to the cross section of the support sections. The one support section is accommodated in the recess with an approximately positive fit and the indexable insert on tightening the fastening screw on account of the wedging effect is pressed against the second bearing surface, whilst the support surface of the other support section bears on a radial outer section of the first bearing surface.

11 Claims, 5 Drawing Sheets view A view B view C

INDEXABLE MILLING INSERT

BACKGROUND OF THE INVENTION

The invention relates to an indexable insert milling tool.

From DE 43 04 071 there is known a plane cutter with indexable inserts in which the milling indexable inserts are arranged in insert seats which are formed in the chip spaces of the milling body. The insert seat and the milling indexable insert are arranged such that a negative radial angle of the insert seat, a negative axial angle of the insert seat and a positive effective cutting angle are in each case 12° to 18°, preferably 15°. Inspite of the large effective cutting angle for the indexable inserts there results a stable cross section since the lateral surfaces (free surfaces) may run at right angles to the bearing surface. The chip spaces are relatively short. They may therefore be worked in with relatively short milling tools which keeps the manufacturing cost small. The geometry of the chip spaces furthermore permits a smaller separation of the plane miller, i.e. a higher cutting speed. Finally the bores on the tool holder for fastening the indexable inserts may be designed relatively long. By way of this the security of the insert seat is increased even further.

With high speed millers the fastening of indexable inserts is loaded very heavily. With this there exists the danger that the high centrifugal forces loosens screw fastenings or lead to the shearing off of the tensioning screws. Independent of this a fastening of the indexable insert is very heavily loaded by way of the cutting forces, above all with a negative mounting angle.

It is therefore the object of the invention to provide an indexable insert milling tool in which the indexable inserts are arranged and fastened in the milling body such that they are able to resist high cutting and centrifugal forces.

With the miller according to the invention the indexable insert on the rear side on the cutting edge side comprises a raised elongate support section wedge-shaped in cross section with a lower support surface, wherein the distanced support surfaces run parallel on the rear side of the indexable insert. In the insert seat bordering the bearing surface which assumes the radial loading and against which therefore the lateral surface of the indexable insert bears there is formed a recess with surfaces approximately parallel to the second bearing surface. The recess in cross section is formed complementarily to the cross section of the support sections in a manner such that the support section is accommodated in the recess with an approximately positive fit and the indexable insert on tightening the fastening screw on account of the wedging effect is pressed against the second bearing surface whilst the support surface of the other support section bears against a radial outer section of the first bearing surface.

In other words, the radial bearing surface together with a wedge surface of the recess forms the possibility of a positive-fit connection to the complementarily formed support section. As a result of the wedging effect on tightening the fastening screw a force component against the radial bearing surface is produced. By way of this the indexable insert on the carrier body is centered and is effectively secured against a drifting to the outside.

The rear-side support surface of the respective other support surface at the same time lies on the first bearing surface of the miller body. The indexable insert therefore has a bridge-like cross section on the rear side. The indexable insert is therefore relatively broadly supported.

The design according to the invention has several advantages. The indexable insert may be arranged at a relatively large negative mounting angle. By way of this there results a favourable chip space with a relatively small volume which permits a narrow tooth pitch angle to be achieved, i.e. a large cutting number on the circumference of the miller. At the same time it is prevented that the indexable insert is pulled out by way of cutting forces.

In spite of a narrow tooth pitch comparatively stable indexable insert cross sections with large positive free angles and effective cutting angles may be applied.

A further advantage is the good workability of the insert seats (with a large negative mounting angle). Relatively short and stable working tools with low unclamping lengths may be applied.

The centering effect of the described clamping system ensures that the indexable inserts compellingly are clamped with a high truth of running. A twisting of the indexable insert or a radial displacement is ruled out, and specifically during the clamping procedure as well as cutting loading on application. Apart from the increased clamping security as a side effect there arises advantages on reversing or changing the indexable insert. With the clamping procedure the indexable insert is only yet to be displaced in the axial direction against the bearing of the insert seat.

The main advantage of the design according to the invention is however the great strength of the seat of the indexable insert with respect to attacking cutting forces and high centrifugal forces.

The radial bearing surface in the recess on the one hand and the radial bearing surface for the lateral walling of the indexable insert on the other hand may be formed by differing surfaces. According to one formation of the invention it is however advantageous when the second bearing surface forms a wall of the recess.

As already mentioned the back of the indexable insert in cross section is preferably trapezoidal. The insert seat may on the first bearing surface which faces the rear side comprise a rectangular base in the form of a pyramid base which is formed around the threaded bore and whose wall directed towards the second bearing surface represents the wall of the recess forming the wedge surface.

Corresponding to the above embodiment form the rear side of the indexable insert may be formed as a rectangular frame of which two oppositely lying sides form the support section and comprise the support surfaces. The frames connect the support sections to one another and thus stabilize the indexable insert against undesirable deformation.

According to a further formation of the invention the chip space comprises an axial third bearing surface against which one end-face side of the indexable insert comes to bear. Such a bearing surface is however known per se with indexable insert seats in milling bodies.

According to a further formation of the invention the axis of the threaded bore is arranged such that the fastening screw presses the indexable insert against the third bearing surface. By way of this the indexable insert is pretensioned against the third bearing surface.

The indexable insert is mounted in the milling body preferably with a relatively large positive axial angle, the free surface of the indexable insert of the main cutting edge according to another formation of the invention is preferably crowned. The face is according to another formation of the invention designed in the form of a flute.

According to a further formation of the invention the indexable insert at the end-face side may comprise a minor cutting edge with a flanging radius and a plane bezel.

BRIEF DESCRIPTION OF THE DRAWINGS

Embodiment examples of the invention are hereinafter described in more detail by way of drawings.

DETAILED DESCRIPTION OF THE INVENTION

Figure 1:
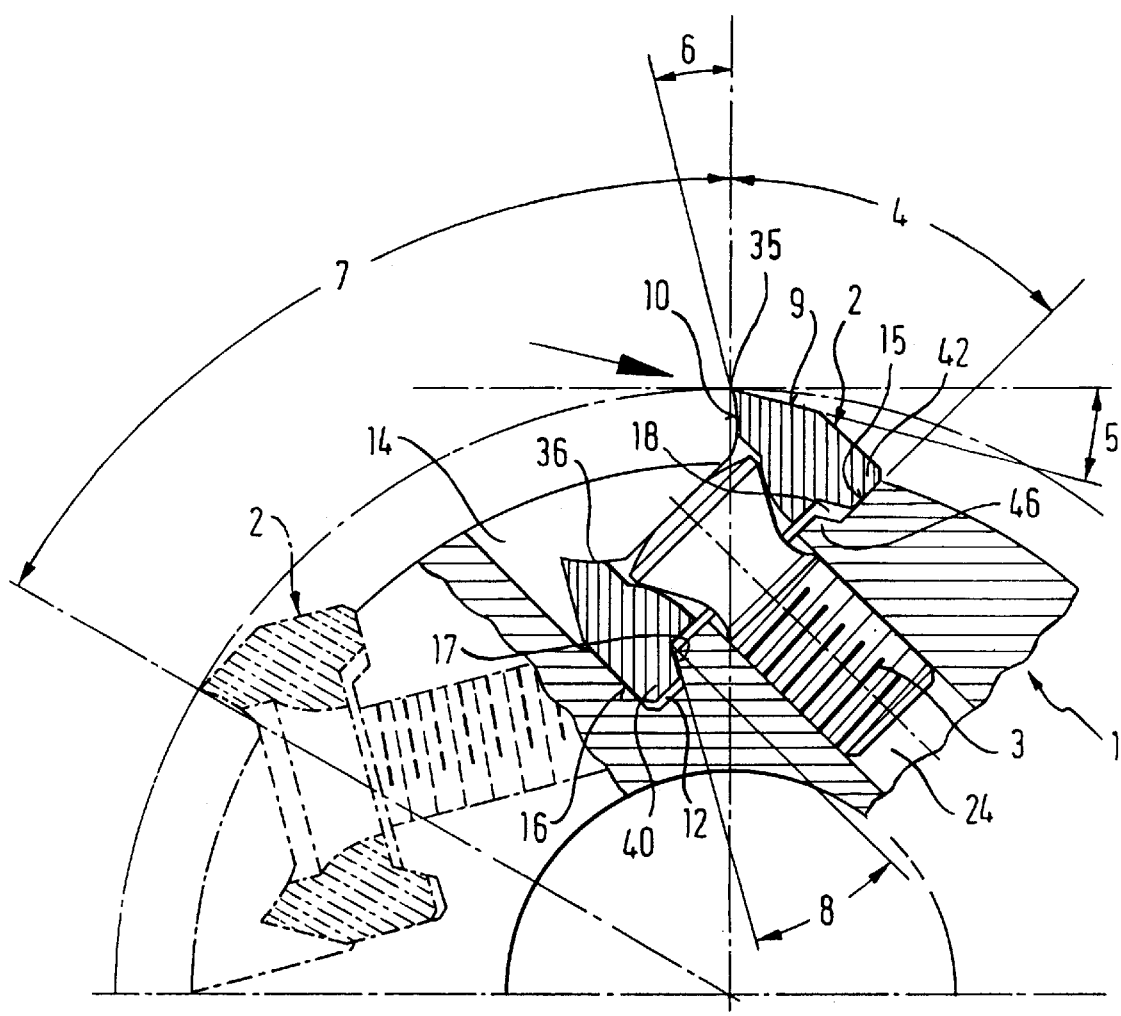
FIG. 1 shows a section through a part of the milling body of an indexable insert milling tool according to the invention.

In the Figures there is provided a shank-like milling body 1 for a corner miller which at one end at circumferential distances comprises chip spaces 14 which contain insert seats for indexable inserts 2. The indexable insert 2 has a central through-bore 30, a rear side which is shaped as a rectangular frame 32, two oppositely lying end-face sides 34 as well as a front side 36 which is formed as a flute. The sides of the indexable insert 2 comprise a free surface 9 which with a face 10 being part of the flute 35 forms a cutter or cutting edge 36. The lateral surface 38 lying below the free surface 9 forms a bearing surface for the bearing against a bearing surface 16 of an insert seat, which will be dealt with further below.

A minor cutting edge is indicated at 19 which has a flanging radius and plane bezel for achieving good finishing surfaces. For the present context it is however of a lesser importance.

The cross section of the indexable insert shown in FIG. 1 results on the rear side a trapezoidal recess 18 so that on the rear side of the indexable insert there are formed two distanced support sections 40, 42 with rear support surfaces 15 which run parallel and in a plane. The transverse connections of the support section 40, 42 at the ends over the other sections of the frame 32 serve the stability.

As can be recognized the indexable insert 2 with respect to its longitudinal axis is formed symmetrically. As a result it is a double cutting indexable insert.

The insert seat of the chip space 14 comprises a first bearing surface 15 in the form of an elongate narrow surface on the radial outer side of the chip space 14. Furthermore a second radial bearing surface 16 is formed which extends at a distance and at an angle to the first bearing surface 15. This second bearing surface serves the bearing of the lateral surface 38 of the indexable insert 2. The second bearing surface 16 is the wall of a recess 12 which in cross section is trapezoidal. The other wall of the recess 12 is formed by a wedge-shaped surface 17 which is part of a quadratic or rectangular, pyramid-base-like base 46 which comprises a threaded bore 24. The threaded bore 24 serves the accommodation of a fastening screw 3 which is guided through the bore of the indexable insert and fastens this on the insert seat. With this one of the two support sections 40 engages with a positive fit into the recess 12 whilst the other support section with its support surface 44 comes to bear against the bearing surface 15 of the milling body 1. The cross section of the indexable insert 2 is therefore bridge shaped. On account of the wedging effect of the wedge surface 17 and of the corresponding wedge-shaped formation of the support section 40 the support section is effectively fastened in the recess 12. Simultaneously there is effected a rigid bearing on the second bearing surface 16. By way of this the indexable insert 2 is securely held above all things against radial forces which load the fastening screw with shear and bending. The indexable insert 2 furthermore bears on a third bearing surface 23 which represents the axial bearing surface and against which the indexable insert 2 is displaced before it is tightened with the help of the fastening screw. The axis of the threaded bore 24 is placed such that the indexable insert 2 is pretensioned against the axial bearing surface 23. Between the base 46 and the floor of the recess 18 of the indexable insert 2 there exists a distance. The centering of the indexable insert 2 therefore takes place essentially via the engagement of a support section 40 with a recess 12. This engagement however has the result that high radial or outwardly acting forces on account of centrifugal forces and of cutting forces may be accommodated.

Figure 3:
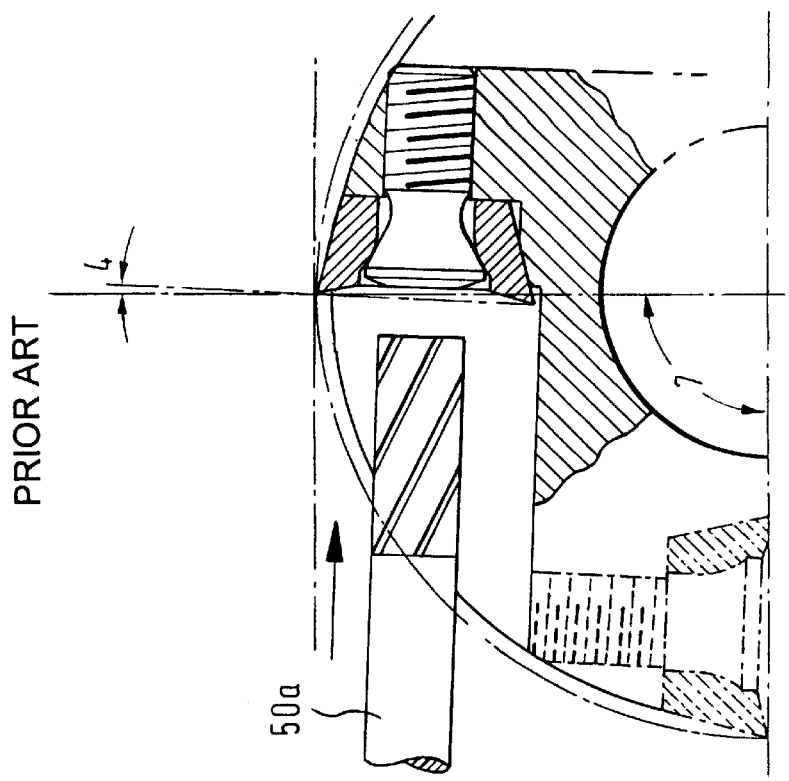
FIG. 3 shows a prior art manufacturing procedure.
Figure 2:
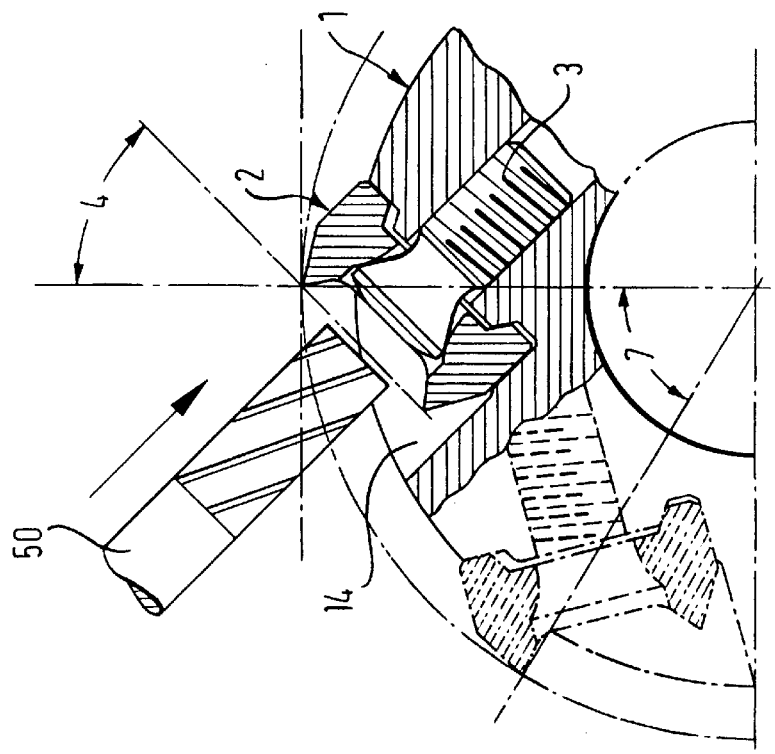
FIG. 2 shows a similar representation as FIG. 1 for illustrating the manufacturing procedure.
Figure 4:
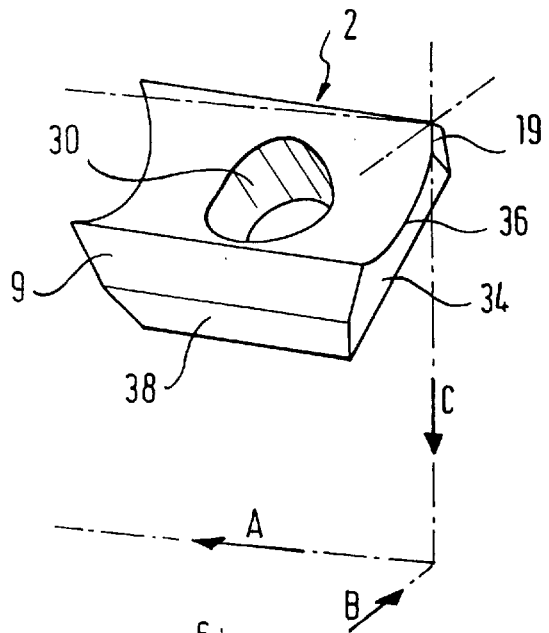
FIG. 4 shows a perspective view of an embodiment of an indexable insert positioned relative to a milling axis.
Figure 5:
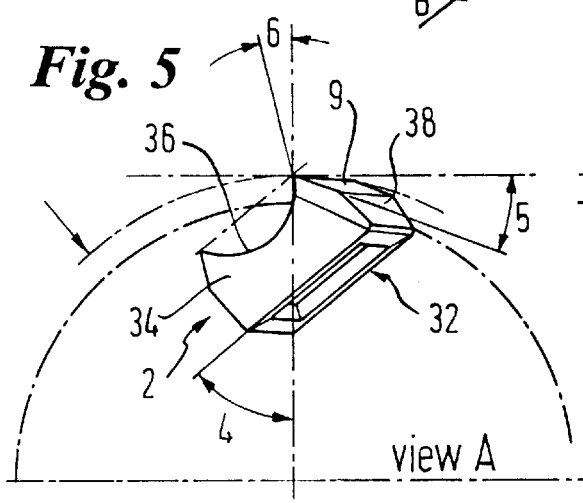
FIG. 5 shows a perspective side view of the embodiment shown in FIG. 4.
Figure 6:
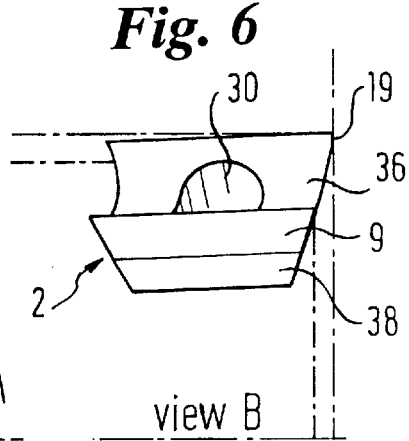
FIG. 6 shows an additional perspective view of the embodiment shown in FIG. 4.
Figure 7:
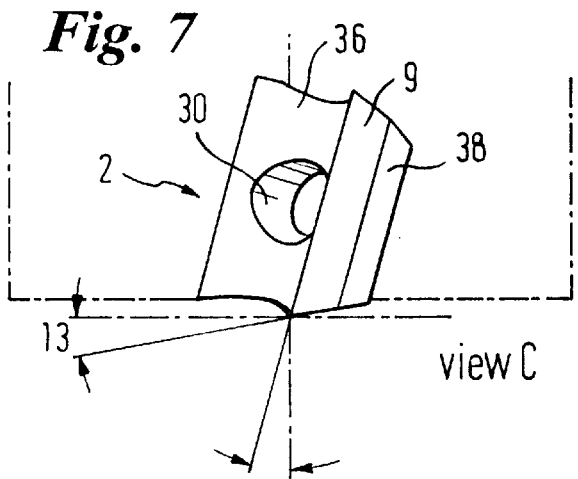
FIG. 7 shows an additional perspective view of the embodiment shown in FIG. 4.
Figure 8:
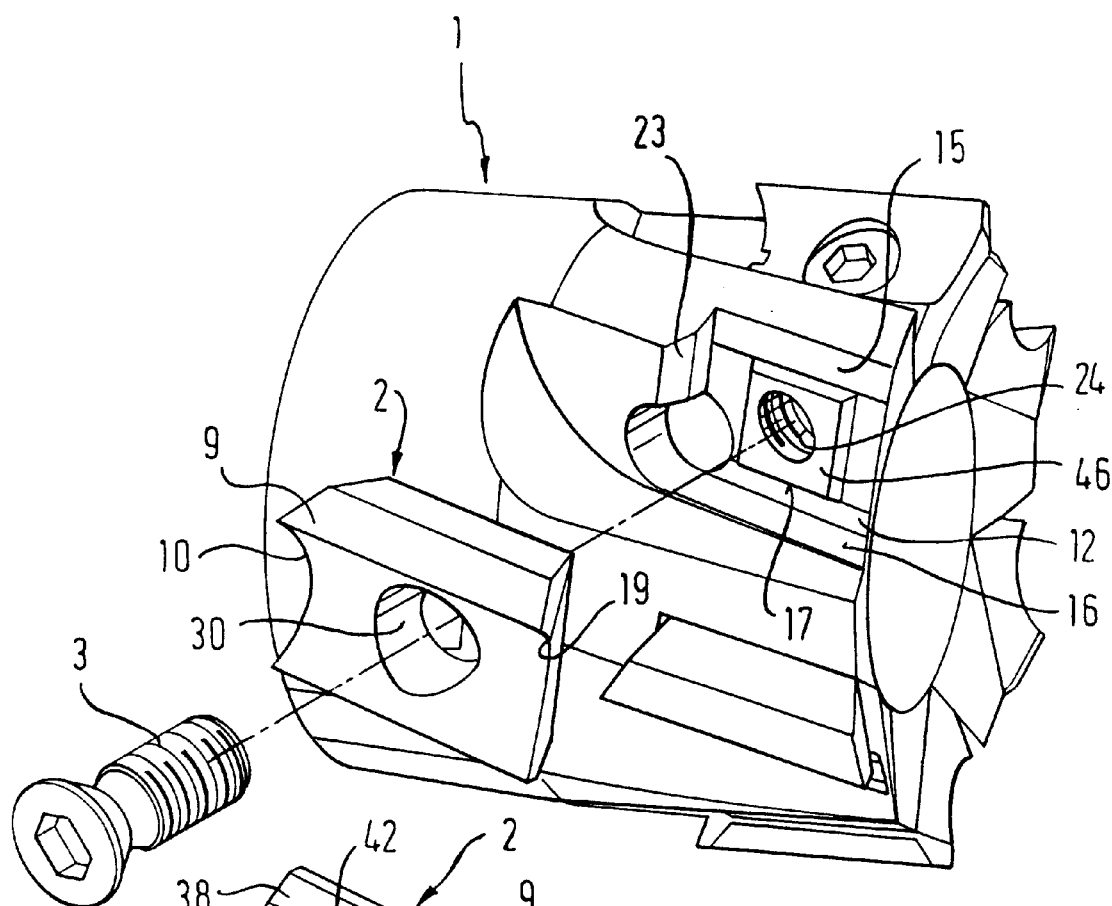
FIG. 8 shows a perspective exploded representation of an embodiment of the indexable insert milling tool.
Figure 9:
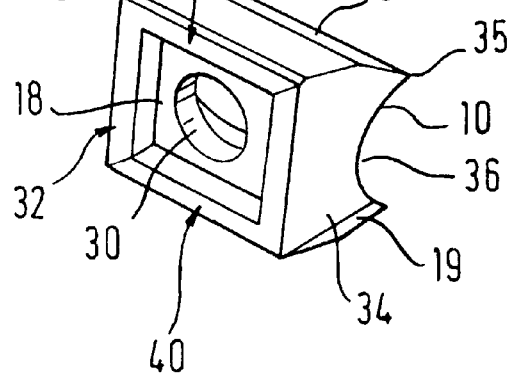
FIG. 9 shows a rear perspective view of an embodiment of an indexable insert for use with the milling tool shown in FIG. 8.

FIG. 2 once again shows a similar arrangement of a miller and an indexable insert as in FIG. 1. Furthermore a milling tool 50 is indicated for manufacturing the chip space 14. One recognizes that a much shorter tool length is required in order to manufacture the chip space 14 than for example with a prior art tool 50a according to FIG. 3 in which a conventional corner miller, as is for example known by DE 43 04 071 and is described further above.

FIGS. 4–7 show the arrangement of the indexable insert 2 with respect to the axes A, B and C of the miller. A is the longitudinal axis of the shank 1 and at the same time the rotational axis. In FIGS. 4–7 the mounting angle 4 of the indexable insert 2 in the milling body is to be recognized. The mounting angle in the present case is between 35° and 45°. The narrow circular pitch made possible by this results from the circular pitch angle 7 according to FIG. 1.

From FIGS. 4–7 there is also deduced the geometry of the indexable insert. There is present a larger lead angle 5, a larger effective cutting angle 6 and a larger end-face effective cutting angle 13. The indexable insert tip 2 is for example ground. The large positive axial angle 13 (angle of twist) results by way of the chip spaces which compellingly arise with a narrow circular pitch. Nevertheless the chips are adequately effectively removed in an axial spiral-shaped manner.

Figure 10:
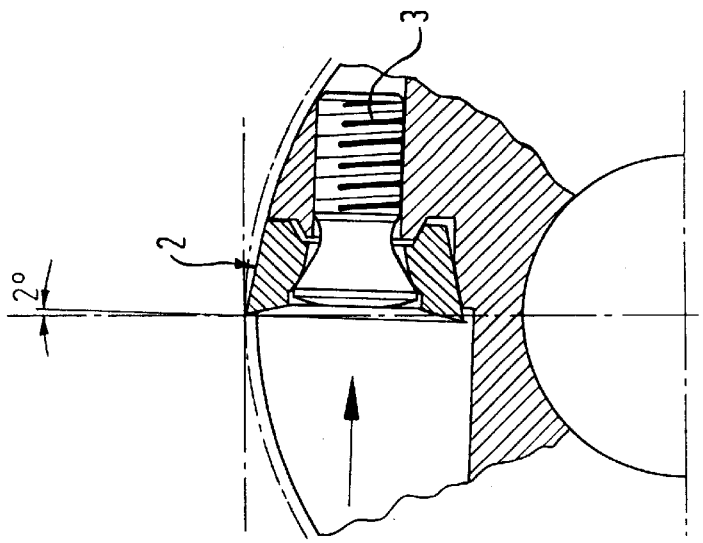
FIG. 10 shows a potential mounting relationship of an indexable insert on an embodiment of the indexable insert milling tool.
Figure 11:
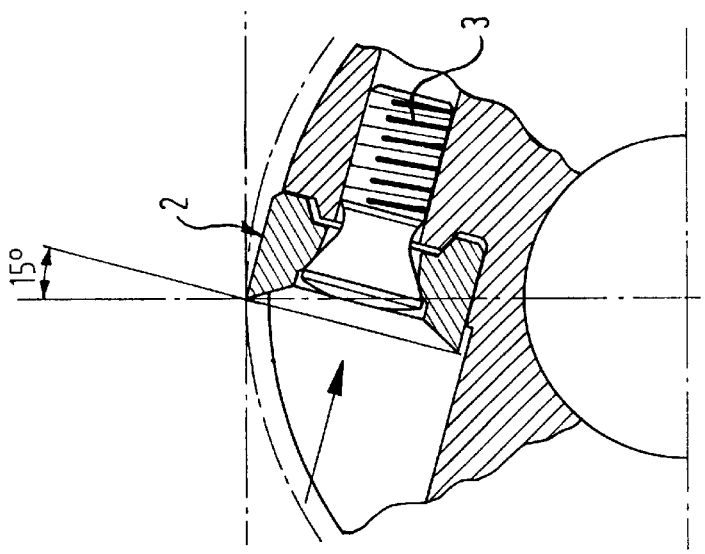
FIG. 11 shows a potential mounting relationship of an indexable insert on an embodiment of the indexable insert milling tool.
Figure 12:
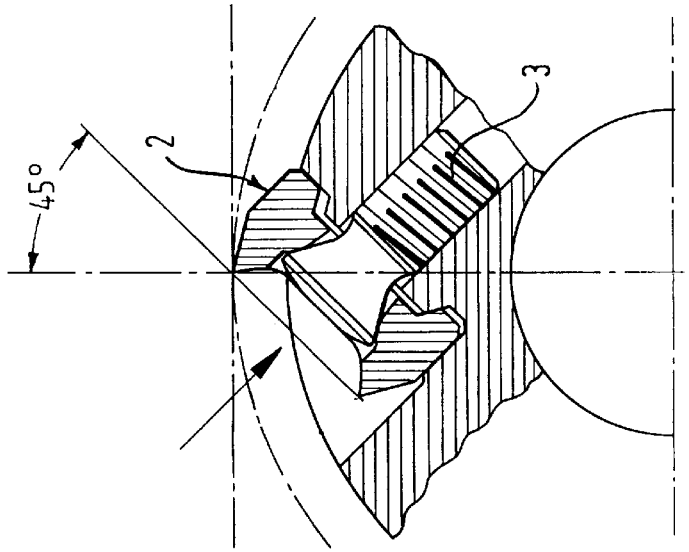
FIG. 12 shows a potential mounting relationship of an indexable insert on an embodiment of the indexable insert milling tool.

In FIGS. 10–12 in a section of a part of a miller according to the invention there are shown identical indexable inserts 2 which however have different contact angles with roughly the same sized cutting angle. In the embodiment shown in FIG. 10 the contact angle is 45 degrees, in the embodiment shown in FIG. 11, the angle is 15 degrees, and in embodiment shown in FIG. 12, the angle is shown as 2 degrees. In all cases the clamping with a positive fit effects a high clamping security, particularly against radially outwardly acting forces.

What is claimed is:

1. An indexable insert milling tool comprising:

a milling body, the milling body having a circumference, the circumference having a plurality of distanced chip spaces, each of the plurality of distanced chip spaces having an inner side, in each of the distanced chip spaces an insert seat is formed, each of the insert seats constructed and arranged to receive an indexable cutting insert thereon, each of the insert seats having a threaded bore, each of the threaded bores having an axis, each of the threaded bores constructed and arranged to threadingly receive a fastening screw therein, each fastening screw constructed and arranged to engagingly secure each of the indexable cutting inserts to each of the insert seats, wherein each of the insert seats comprises a first bearing surface extending roughly perpendicular to the axis of the respective threaded bore, against which a first predetermined surface of a rear side of each of the indexable inserts bears, and a second bearing surface on a predetermined side of the chip space, against which a second predetermined surface of the rear side of each of the indexable inserts not parallel or coplanar with the first predetermined side of each of the indexable inserts laterally bears, wherein each of the indexable inserts has a main cutting edge, the indexable inserts further comprise raised elongate support sections which are separated by a trapezoidal recess such that the non-parallel sides of the trapezoidal recess form wedge surfaces of the elongate support sections, and which support sections also each have a support surface, which support surfaces are parallel to one another and distanced from one another and wherein bordering the second bearing surface in the insert seat there is formed at least one recess, the at least one recess having an axis, the axis of the at least one recess being oriented approximately parallel to the second bearing surface, the at least one recess having a cross section which is formed complimentarily to a cross section of the support sections, wherein a first of the support sections is accommodated in the at least one recess and the indexable insert, on tightening the fastening screw on account of a wedging effect between each of the fastening screws and each of the insert seats, is pressed against the second bearing surface, whilst the support surface of a second of the support sections bears on a section of the first bearing surface.

2. A milling tool according to claim 1, wherein the second bearing surface forms a wall of the at least one recess.

3. A milling tool according to claim 1, wherein each of the threaded bores is formed in a base having a rectangular pyramid shape, the base having at least one wall directed towards the second bearing surface thereby forming a wall of the at least one recess.

4. A miller according to claim 1, wherein the rear side of each of the indexable inserts is a rectangular frame of which two oppositely lying portions form the support sections and comprise the support surfaces.

5. A milling tool according to claim 1, wherein each of the chip spaces comprise a third bearing surface against which a side of the respective indexable insert comes to bear.

6. A milling tool according to claim 5, wherein each axis of each of the threaded bores is arranged such that the respective fastening screw presses the respective indexable inserts also against the respective third bearing surface.

7. A milling tool according to claim 1 wherein the rear side of each of the indexable inserts comprises a recess which is trapezoidal in cross section.

8. A milling tool according to claim 1, wherein the indexable inserts have a predetermined mounting angle, the predetermined mounting angle being between approximately 35° to approximately 45°.

9. A milling tool according to claim 1, wherein the indexable inserts have a predetermined clearance angle and a predetermined effective cutting angle and a predetermined end-face surface clearance angle.

10. A milling tool according to claim 1, wherein a side of each of the indexable inserts which is opposite the rear side contains a flute.

11. A milling tool according to claim 1, wherein each of the indexable inserts further comprise a minor cutting edge.

* * * * *